(12) United States Patent
Lee

(10) Patent No.: US 12,250,424 B2
(45) Date of Patent: Mar. 11, 2025

(54) DISPLAY DEVICE AND METHOD FOR CONTROLLING OPERATION OF THE SAME

(71) Applicant: LG ELECTRONICS INC., Seoul (KR)

(72) Inventor: Kwangryul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/120,210

(22) Filed: Mar. 10, 2023

(65) Prior Publication Data
US 2023/0421835 A1    Dec. 28, 2023

(30) Foreign Application Priority Data
Jun. 24, 2022  (KR) .................. 10-2022-0077504

(51) Int. Cl.
| | | |
|---|---|---|
| H04N 21/426 | (2011.01) | |
| H04N 5/455 | (2006.01) | |
| H04N 5/50 | (2006.01) | |
| H04N 21/258 | (2011.01) | |
| H04N 21/438 | (2011.01) | |
| H04N 21/442 | (2011.01) | |
| H04N 21/466 | (2011.01) | |
| H04N 21/658 | (2011.01) | |

(52) U.S. Cl.
CPC ......... *H04N 21/4263* (2013.01); *H04N 5/455* (2013.01); *H04N 5/50* (2013.01); *H04N 21/25808* (2013.01); *H04N 21/42638* (2013.01); *H04N 21/4382* (2013.01); *H04N 21/4383* (2013.01); *H04N 21/44209* (2013.01); *H04N 21/4424* (2013.01); *H04N 21/4667* (2013.01); *H04N 21/6582* (2013.01)

(58) Field of Classification Search
None
See application file for complete search history.

(56) References Cited

U.S. PATENT DOCUMENTS

| | | | | |
|---|---|---|---|---|
| 9,479,837 | B1 * | 10/2016 | Rothaus | H04N 21/6168 |
| 9,942,598 | B2 * | 4/2018 | Reddy | H04N 21/4382 |
| 2003/0056221 | A1 * | 3/2003 | Zhang | H04M 1/72415 |
| | | | | 348/E5.003 |

(Continued)

OTHER PUBLICATIONS

European Patent Office Application Serial No. 23157889.9, Search Report dated Oct. 30, 2023, 9 pages.

*Primary Examiner* — John W Miller
*Assistant Examiner* — Sean N. Haiem
(74) *Attorney, Agent, or Firm* — LEE, HONG, DEGERMAN, KANG & WAIMEY

(57) ABSTRACT

Disclosed are a display device and a method for operating the same. According to an embodiment of the present disclosure, a display device includes a display, a tuner including a first demodulator and a plurality of RF ICs which receive a signal through a tuned channel, and a processor including a second demodulator and configured to lock a channel through each demodulator according to a tuning request, process a signal demodulated through a demodulator selected based on a threshold sensitivity value for signal detection individually set in the each demodulator, and control a video to be output through the display.

13 Claims, 9 Drawing Sheets

(56) References Cited

U.S. PATENT DOCUMENTS

| | | | | |
|---|---|---|---|---|
| 2007/0089148 A1* | 4/2007 | Oh | .................. | H04N 21/44209 |
| | | | | 725/132 |
| 2009/0113488 A1* | 4/2009 | Arroyo | ................ | H04N 21/426 |
| | | | | 725/62 |
| 2009/0247099 A1* | 10/2009 | Jaisimha | ............... | H03J 1/0066 |
| | | | | 455/161.2 |
| 2010/0067630 A1* | 3/2010 | Gatta | ................ | H04N 21/4263 |
| | | | | 375/350 |
| 2012/0044426 A1* | 2/2012 | Jeffery | ................... | H04N 7/106 |
| | | | | 348/731 |
| 2013/0007789 A1* | 1/2013 | Wang | .................... | H04B 17/26 |
| | | | | 725/14 |
| 2015/0208063 A1* | 7/2015 | Seo | ........................ | H04H 40/90 |
| | | | | 725/68 |
| 2016/0142759 A1* | 5/2016 | Shah | .................. | H04L 12/2885 |
| | | | | 725/111 |
| 2016/0212472 A1* | 7/2016 | Shirasuka | .......... | H04N 21/4394 |
| 2017/0171582 A1* | 6/2017 | Langer | ............... | H04N 21/4382 |

\* cited by examiner

DISPLAY DEVICE AND METHOD FOR CONTROLLING OPERATION OF THE SAME

CROSS-REFERENCE TO RELATED APPLICATION(S)

Pursuant to 35 U.S.C. § 119(a), this application claims the benefit of earlier filing date and right of priority to Korean Patent Application No. 10-2022-0077504, filed on Jun. 24, 2022, the contents of which are hereby incorporated by reference herein in its entirety.

BACKGROUND OF THE INVENTION

1. Field of the Invention

The present disclosure relates to a display device, and more particularly, to a display device for outputting a video through comparison of two demodulators of a hybrid tuner, and a method for controlling an operation thereof.

2. Discussion of the Related Art

A display device is a device having a function of receiving, processing, and displaying an image which a user is able to watch.

Such a display device receives, for example, a broadcast signal selected by the user among broadcast signals transmitted from a broadcasting station, separates an image signal from the received signal, and displays the separated image signal on a display.

Recently, display devices employing a dual tuner are gradually increasing.

However, in the conventional dual tuners, one of the dual tuners is set to output a video and the other is set to record a video.

In particular, a tuner and a demodulator for video output are fixed in advance.

For this reason, when a threshold sensitivity for detecting a signal is high in a field signal environment, a signal with a lot of noise in the weak electric field may be mistakenly recognized as a signal and when the sensitivity is lowered, the signal may be mistakenly recognized as a noise, thus resulting in a problem.

As a result, there is a problem in that a channel skipping or image cracking occurs in a specific local signal environment.

SUMMARY OF THE INVENTION

An object of the present disclosure is to provide a display device that sets different characteristic values for each demodulator of a display device employing a dual tuner, and prevents channel skipping or deterioration through comparison thereof, and an operating method thereof.

According to an embodiment of the present disclosure, a display device includes a display, a tuner including a first demodulator and a plurality of RF ICs which receive a signal through a tuned channel, and a processor including a second demodulator and configured to lock a channel through each demodulator according to a tuning request, process a signal demodulated through a demodulator selected based on a threshold sensitivity value for signal detection individually set in the each demodulator, and control a video to be output through the display.

According to an embodiment of the present disclosure, a method for operating a display device, includes receiving a signal through a tuned channel; locking, by each demodulator, a channel; processing a signal demodulated through a demodulator selected based on a threshold sensitivity value for signal detection individually set in each demodulator; and controlling a video to be output through a display.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen.

Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Hereinafter, the display device according to the embodiment of the present disclosure will be described by taking a display device as an example for convenience of description, but the present disclosure is not limited thereto.

Figure 1:
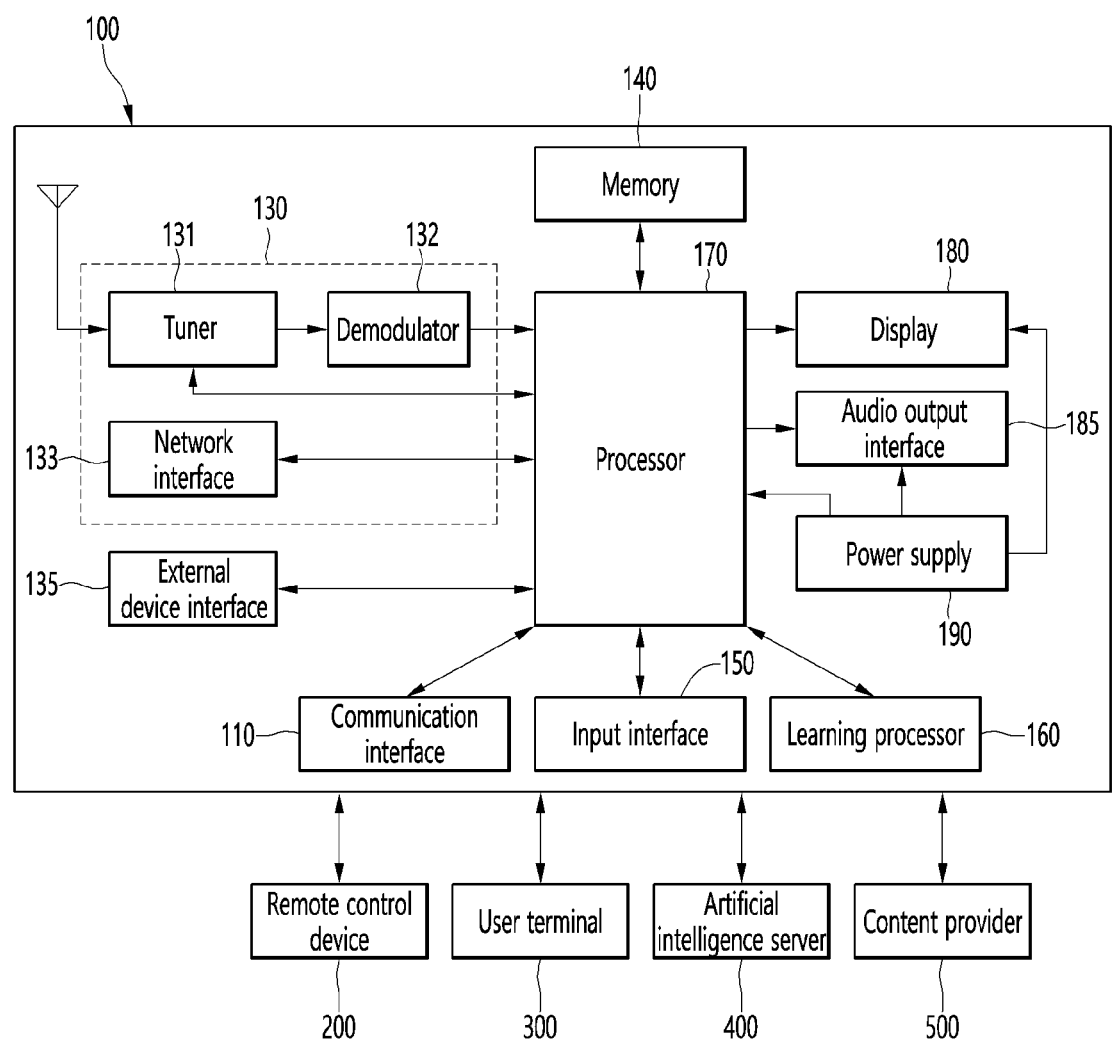
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or a content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may playback a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a Ultra Wideband (UWB) communication method, a ZigBee communication method, a Radio Frequency (RF) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

Also, the audio signal processed by the controller 170 may be input to the external output device through the external device interface 135.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), UWB, ZigBee, Near Field Communication (NFC), Wi-Fi (Wireless-Fidelity), Wi-Fi Direct, and Wireless Universal Serial Bus (USB) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and on screen display (OSD) signals processed by the controller 170, or image signals or data signals received from the external device interface 135 into R, G, and B signals, and generate drive signals.

Meanwhile, since the display device 100 shown in FIG. 1 is an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

Unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 2:
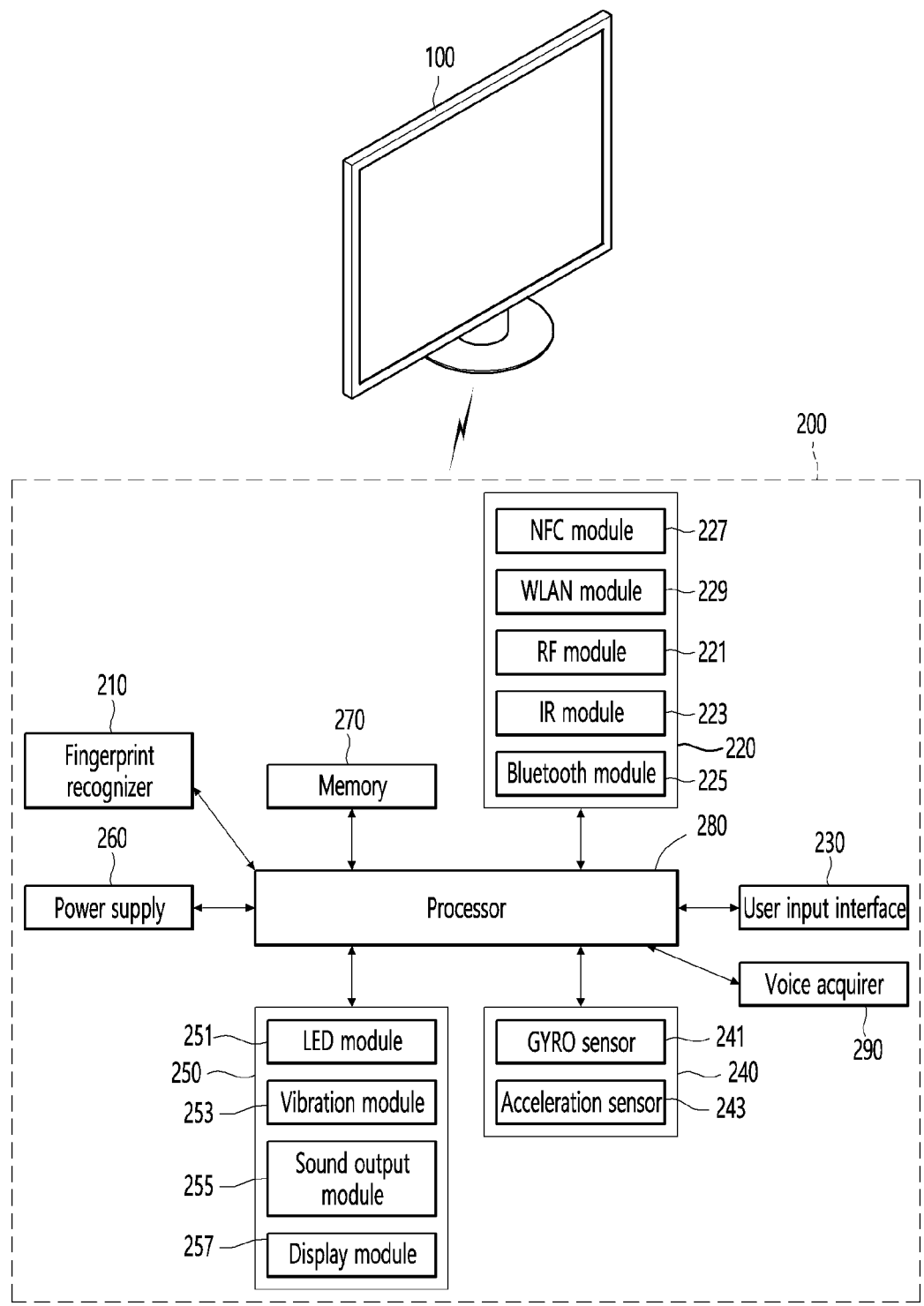
FIG. 2 is a block diagram illustrating a remote control device according to an embodiment of the present disclosure.
Figure 3:
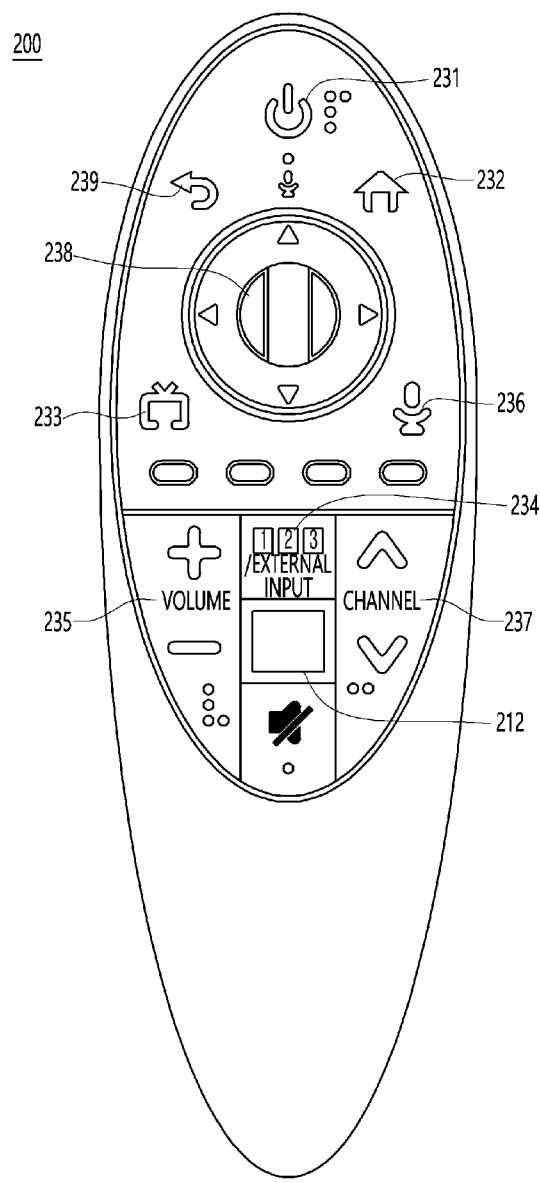
FIG. 3 illustrates an example of an actual configuration of a remote control device according to an embodiment of the present disclosure.

FIG. 2 is a block diagram of a remote control device 200 according to an embodiment of the present disclosure, and FIG. 3 illustrates an actual configuration example of the remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC communication standard, and a WLAN circuit 229 capable of transmitting and receiving signals to and from the display device 100 according to the WLAN communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
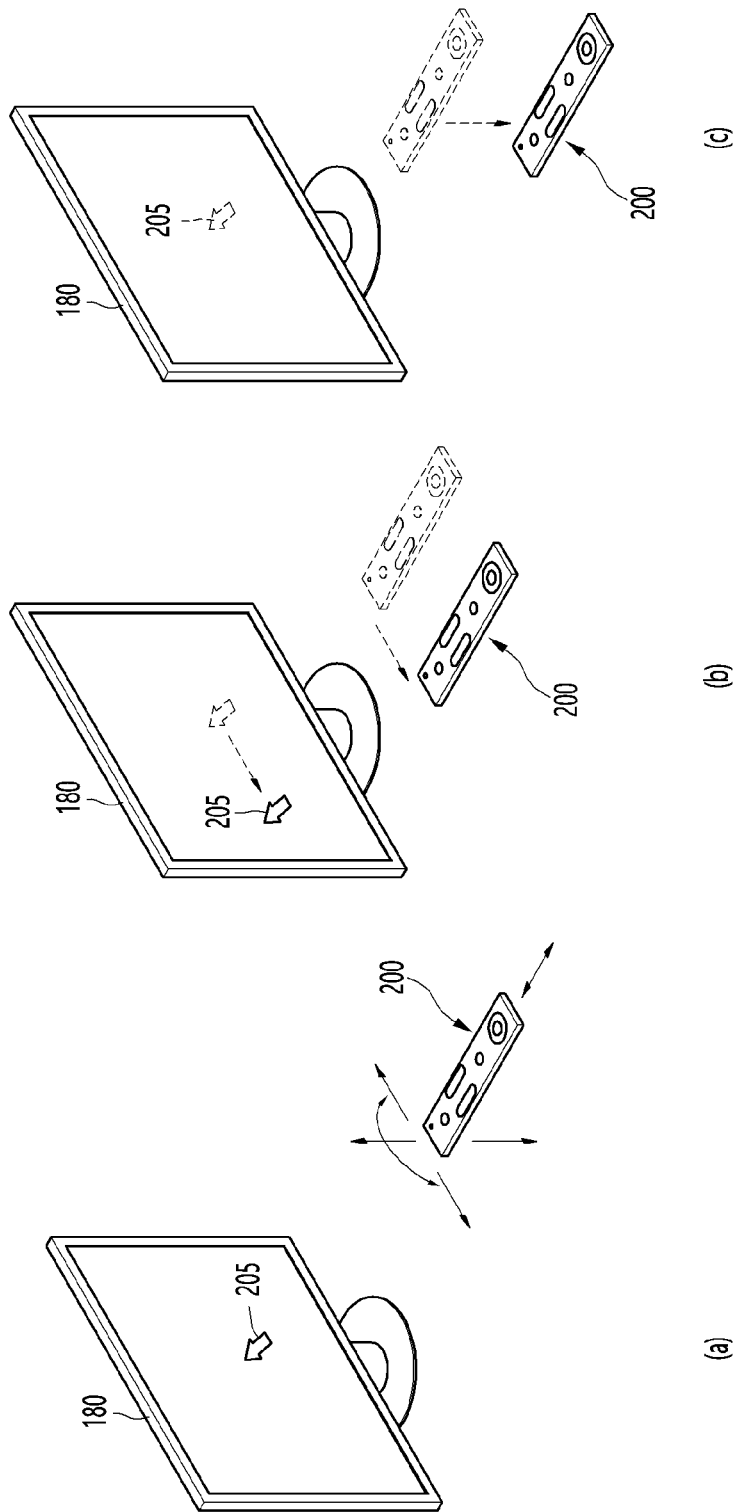
FIG. 4 illustrates an example of using a remote control device according to an embodiment of the present disclosure.

FIG. 4 illustrates an example of using a remote control device according to an embodiment of the present disclosure.

FIG. 4(a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In FIG. 4(b), it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In FIG. 4(c), it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and the forward and backward movements may be recognized. In a state in which a specific button in the remote control device 200 is not being pressed, the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Hereinafter, there will be described a case of preventing occurrence of deterioration such as a channel skipping or image cracking by respectively setting different characteristic values to a plurality of demodulators of the display device 100 equipped with, for example, a dual tuner and processing a received signal.

The display device 100 may include a display 180, a tuner 510 comprising a first demodulator 520 and a plurality of RF ICs 512 to 518 for receiving a signal through a tuned channel, and a processor 550 comprising a second demodulator 560 and configured to lock a channel through each of the demodulators according to a tuning request, process a signal demodulated through a specific demodulator selected based on a threshold sensitivity value for signal detection individually set in each demodulator, and perform control such that a video is output through the display 180. In this case, the specific demodulator may be determined and selected by various algorithms. The algorithm or the threshold sensitivity value may be defined differently for channels, mediums, and the like.

Figure 5:
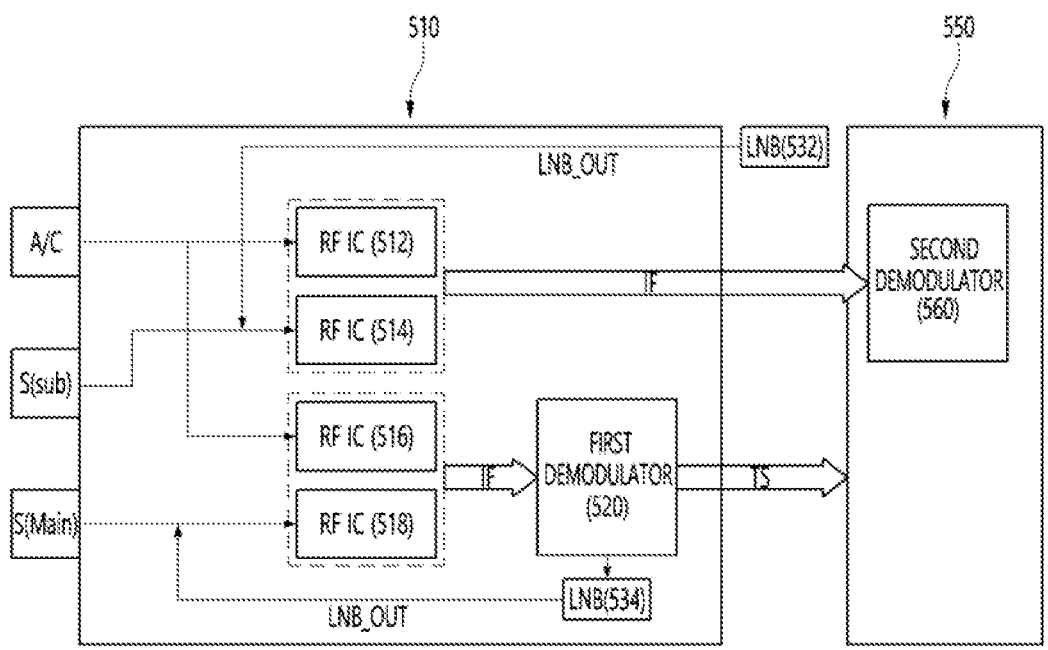
FIG. 5 is a block diagram of a display device equipped with a dual tuner according to an embodiment of the present disclosure.

FIG. 5 is a block diagram of a display device 100 equipped with a dual tuner 510 according to an embodiment of the present disclosure.

Referring to FIG. 5, the display device 100 may include a dual tuner 510 and a processor 550.

The dual tuner 510 may include a plurality of RF ICs 512 to 518 and a first demodulator 520. In this case, low noise block downconverters (LNBs) 532 and 534 may be operated in relation to a satellite signal.

Each of the RF ICs 512 to 518 may be configured to convert an RF signal received through a medium into an intermediate frequency (IF) signal.

The RF ICs 516 and 518 may be configured to convert terrestrial (A, Air)/cable (C, Cable) and satellite (S (main)) signals to IF signals and the RF ICs 512 and 514 may be configured to convert terrestrial (A, Air)/Cable (C, Cable) and satellite (S (sub)) signals to IF signals.

The first demodulator 520 may be configured to demodulate the IF signals which have been subjected to conversion through the RF ICs 516 and 518 to generate a transport stream (TS).

The second demodulator 560 is included in the processor 550 and may demodulate the IF signals which have been subjected to conversion through through the RF ICs 512 and 514 to generate a TS.

The processor 550 may be configured to receive the TSs respectively generated by the demodulators 520 and 560 and perform processing to output a video through the display 180.

Hereinafter, the operation of the processor 550 will be described in more detail as follows.

Figure 6:
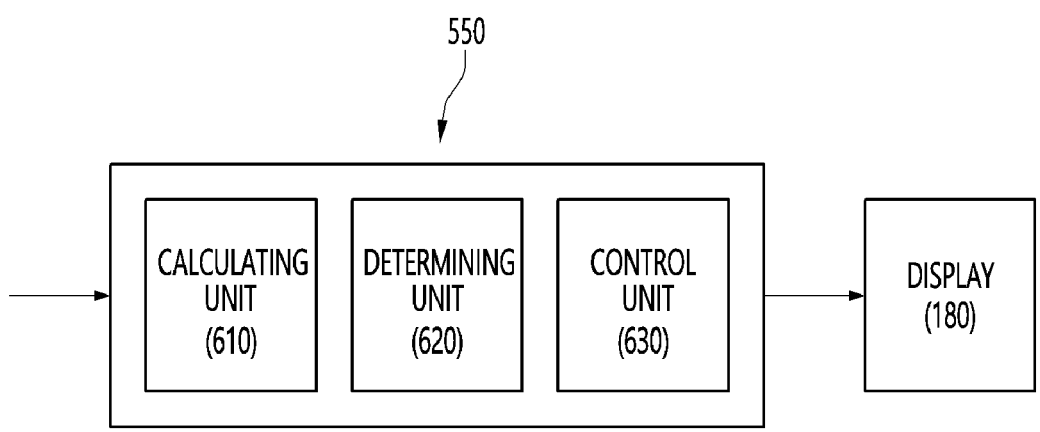
FIG. 6 is a block diagram of a processor according to an embodiment of the present disclosure.

FIG. 6 is a block diagram of a processor 550 according to an embodiment of the present disclosure.

Referring to FIG. 6, the processor 550 may further include a calculating unit 610, a determining unit 620, and a control unit 630 in addition to the second demodulator 560 of FIG. 5.

The calculating unit 610 may be configured to calculate the number of locked channels through each demodulator.

The determining unit 620 may be configured to compare and determine the result of the calculating unit 610, that is, the number of channels locked through the first demodulator 520 and the number of channels locked through the second demodulator 560, and transmit the result of the comparison/determination to the control unit 630.

The calculating unit 610 may be configured to calculate a threshold sensitivity value for signal detection for each channel and each medium for each demodulator. In this case, the determining unit 620 may be configured to determine whether the threshold sensitivity value calculated by the calculating unit 610 is appropriate for a corresponding channel and a corresponding medium.

The control unit 630 may be configured to receive the result of the comparison/determination from the determining unit 620, determine and select a specific demodulator according to the received result, and perform control such that a video is output through the display 180 based on the TS generated through the selected demodulator.

Hereinafter, an operating method of a display device will be described in more detail as follows.

FIGS. 7 to 10 are flowcharts for an operating (control) method for outputting a video in a display device 100 equipped with a dual tuner according to embodiments of the present disclosure.

Figure 7:
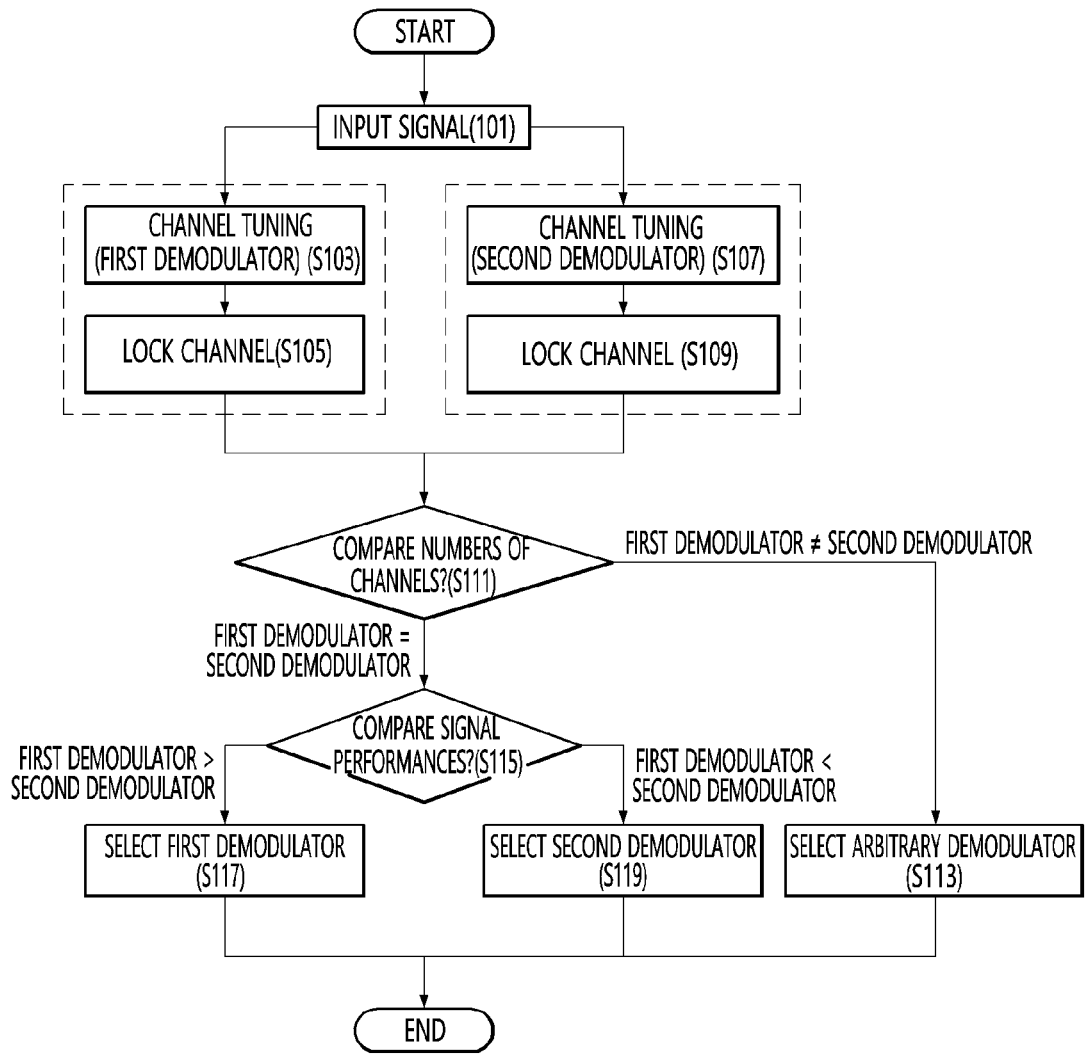
FIGS. 7 to 11 are flowcharts for a video output method in a display device equipped with a dual tuner according to embodiments of the present disclosure.

FIG. 7 illustrates an example of determining and selecting a specific demodulator based on the number of locked channels and processing a signal.

First, referring to FIG. 7, when a signal is input through a tuned channel (S101), each demodulator may be configured to lock a channel by tuning the channel (S103, S105, S107, S109). In this case, the channel tuning may be performed according to a user's auto tuning request or manual tuning request through a remote control device or the like.

That is, when a signal is received through a channel tuned by the dual tuner according to a channel tuning request, the signal is transmitted to the first demodulator 520 and the second demodulator 560, individually and each demodulator may be configured to lock the channel based on the transmitted signal.

The processor 550 may be configured to receive information on the number of channels respectively locked by the demodulators and compare the number of channels (S111).

When the number of channels locked by the two demodulators are not identical as a result of comparing the number of channels respectively locked by the demodulators, the processor 550 may be configured to select an arbitrary demodulator (S113). Here, the arbitrary demodulator may be a demodulator that locks more channels.

Even when the number of channels locked by the two demodulators are identical as a result of comparing the number of channels respectively locked by the demodulators, the processor 550 may be configured to select an arbitrary demodulator. However, in the above-described case, the performances of signals received through the channels locked by each demodulator may be compared before selecting an arbitrary demodulator (S115).

In this case, the performances of the signals may be compared using, for example, at least one of a Received Signal Strength Indicator/Indication (RSSI) indicating the strength of a received signal, a signal-to-noise ratio (SNR) for the received signal, and the like. The processor 550 may be configured to comprehensively determine the signal performance for the received signal by determine all of factors for signal performance determination and set priorities to the factors and determine the performance of the received signal while making a comparison sequentially for all of the factors starting with the factor with higher priority.

The processor 550 may be configured to select the demodulator 520 or 560 having superior signal performance based on the signal performance comparison/determination result in step S115 (S117 or S119).

The processor 550 may be configured to output a video through the display 180 based on the TS generated through the selected demodulator 520 or 560 (S121).

Figure 8:
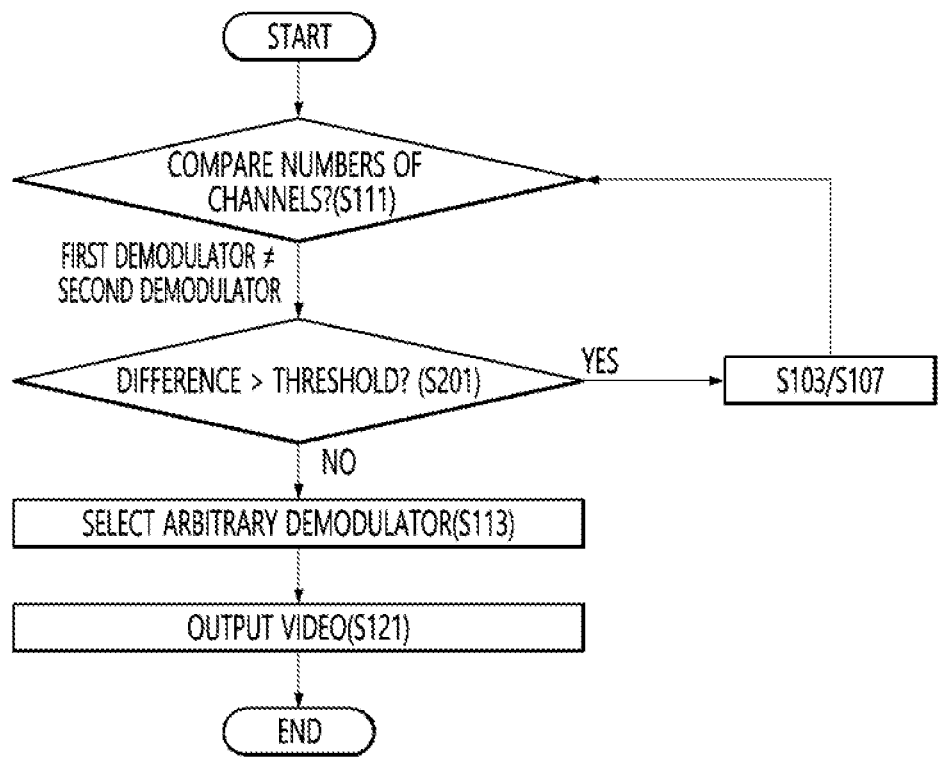

Next, FIG. 8 illustrates an example of processing a signal in consideration of the reliability of channel tuning according to a difference in the number of channels locked through demodulators, for example.

FIG. 8 may be, for example, another embodiment of an operation after step S111 of FIG. 7. In particular, FIG. 8 may be a processing method when the number of channels locked by the first demodulator 520 and the number of channels locked by the second demodulator 560 are not identical as the result of the determination in step S111 of FIG. 7.

Referring to FIG. 8, when the number of channels respectively locked by the demodulators are not the same in step S111, the processor 550 may be configured to again determine whether a difference between the number of channels respectively locked through the two demodulators is greater than a threshold (S201).

For example, since it can be considered that there is a problem with the reliability of the corresponding tuning, for example, the performance or demodulation process of at least one demodulator when the number of locked channels through the two demodulators differ greatly from each other, the processor 550 may be configured to perform control to perform re-tuning (steps S103 and S107).

On the other hand, when the difference in the number of channels respectively locked by the demodulators is not greater than the threshold, the processor 550 may be configured to select an arbitrary demodulator, that is, a demodulator that locks more channels as shown in FIG. 1 (S113), and output a video (S121).

Figure 9:
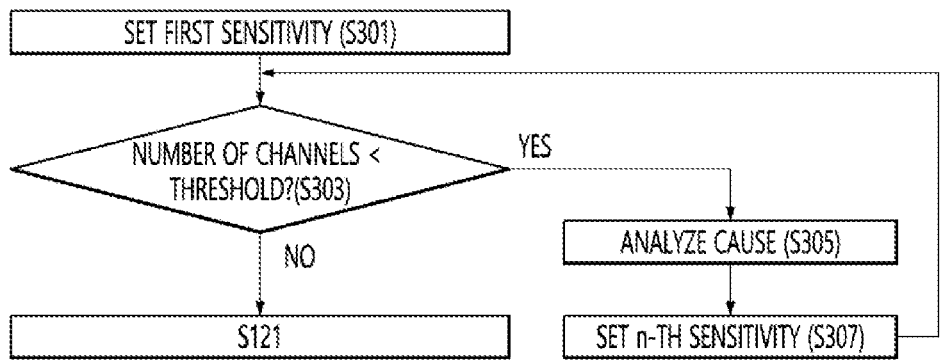

Next, FIG. 9 illustrates an embodiment of setting and changing a threshold sensitivity value for signal detection. FIG. 9 relates to, for example, any one demodulator, and other demodulator may also be processed through the same flow.

For convenience of description, the second demodulator 560 will be exemplified in the following description.

Referring to FIG. 9, the processor 550 may be configured to set a first threshold sensitivity value for signal detection in the second demodulator 560 (S301).

After setting the first threshold sensitivity value for signal detection in the second demodulator 560 in step S301, the processor 550 may be configured to determine whether the number of channels locked after channel tuning is less than a threshold (S303).

When the number of channels locked after channel tuning is not less than the threshold as a result of the determination, the processor 550 may be configured to perform processing such that a video is output as it is without adjustment such as changing the preset first threshold sensitivity value (S121).

However, when the number of channels locked after channel tuning is less than the threshold as a result of the determination, the processor 550 may be configured to analyze a corresponding cause (S305).

The processor 550 may be configured to extract an n-th sensitivity value based on the cause analyzed in step S305, again set the extracted n-th sensitivity value in the second demodulator 560, and repeatedly perform the above-described process until the number of locked channels is equal to or greater than the threshold (S307).

Accordingly, the value of "n" in step S307 is a positive integer and may be at least 2 or more. The value may vary depending on how finely the level of the sensitivity value is classified, and the processor 550 may configure a lookup table for causes and sensitivity levels in advance to enable an operation to be controlled accordingly.

The above description may be applied to the first demodulator 520 in the same or similar manner. However, a sensitivity value set for the second demodulator 560 and a sensitivity value set for the first demodulator 520 may be different from each other. Also, a lookup table configured for the second demodulator 560 and a lookup table configured for the first demodulator 520 may be identical to or different from each other.

The processor 550 may be configured to set different threshold sensitivity values for signal detection of the first demodulator 520 and the second demodulator 560. However, the difference between the threshold sensitivity values set for the two demodulators may be determined and applied according to settings.

Figure 10:
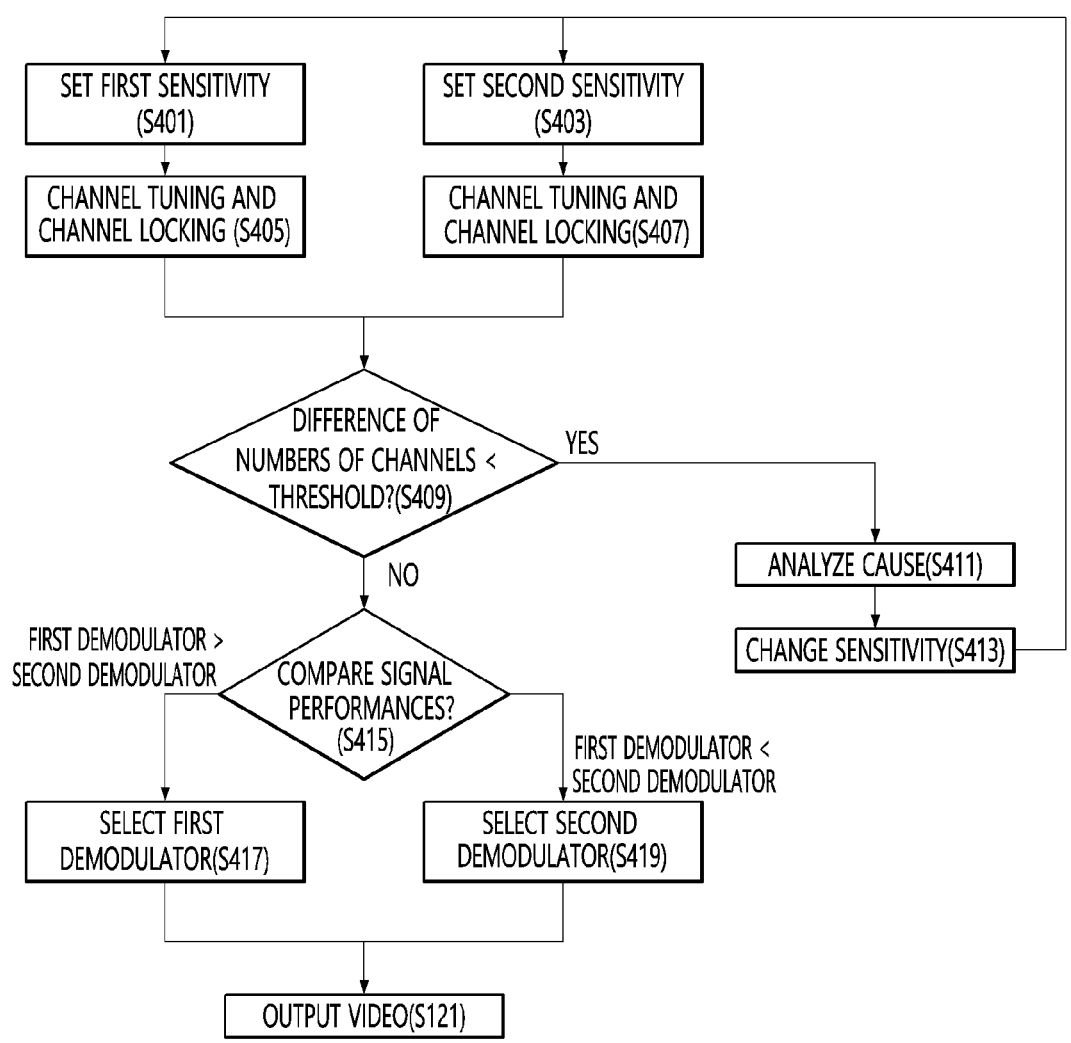

Also, the processor 550 may be configured to change or adjust the threshold sensitivity values for signal detection of the first demodulator 520 and the second demodulator 560 through firmware or software update or the like as shown in FIG. 10 to be described later. In this case, a specific region or global upgrade may be performed by using a code or the like, if necessary. For example, since characteristics or environments related to signals may vary depending on regions, whether to apply the update may be determined in consideration of such circumstances.

FIG. 10 illustrates an embodiment in which signal processing is performed based on a sensitivity value on a per channel basis or a per medium basis.

Referring to FIG. 10, the processor 550 may be configured to set different sensitivity values for demodulators, and each demodulator may be configured to tune channels based on the sensitivity value set by the processor 550 and locks the channels (S401 to S407). Although the example is described for convenience of description in which a first sensitivity value is set in the first demodulator 520 and a second sensitivity value is set in the second demodulator 560, the present disclosure is not limited thereto.

The processor 550 may be configured to determine and apply a sensitivity value to be set in each demodulator in advance on a per channel basis or a per medium basis. The processor 550 may be configured to determine a sensitivity value in consideration of characteristics, importance, or the like of a target channel on a per channel basis. The processor 550 may be configured to determine a sensitivity value according to a medium, that is, considering characteristics of terrestrial waves, cables, and satellites. The processor 550 may be configured to determine a sensitivity value in consideration of the medium and the channel at the same time.

In addition, when determining the sensitivity value and setting the sensitivity value in each demodulator, the processor 550 may be configured to refer to the history of a sensitivity value previously set in each demodulator.

The processor 550 may be configured to compare a difference between the number of channels locked respectively through demodulators in which different sensitivity values are set, and and determine whether the difference is less than a threshold as a result of the comparison (S409). The reason for this may be to determine the reliability of the performance or result of above-described demodulation, that is, the reliability of the sensitivity value set in each demodulator.

Since there may be a problem in the above-described reliability when the difference is less than the threshold as a result of the determination in step S409, the processor 550 may be configured to analyze the cause (S411) and determine a demodulator in which it is necessary to change (or adjust) the sensitivity value and a sensitivity value to be set based on a result of the analysis and perform re-tuning by applying the corresponding sensitivity value to the corresponding demodulator. This re-tuning process may be repeatedly performed, for example, until the difference is equal to or greater than the threshold.

Meanwhile, the processor 550 may be configured to skip steps S409 to S413 without performing the steps. That is, the above steps may not be essential.

On the other hand, when the difference is less than the threshold as a result of the determination in step S409, or after the locking of channels (S405 and S407), the processor 550 may be configured to compare the performances of the signals of the locked channels, select a demodulator having superior signal performance (S417 or S419), and perform signal processing for outputting a video from a TS generated through the selected demodulator (S121).

When changing the sensitivity value in step S413, the processor 550 may be configured to perform different processing on a per channel basis or a per medium basis with respect to the degree of change, for example, the level or change range related to how much the sensitivity value is to be changed at once.

Figure 11:
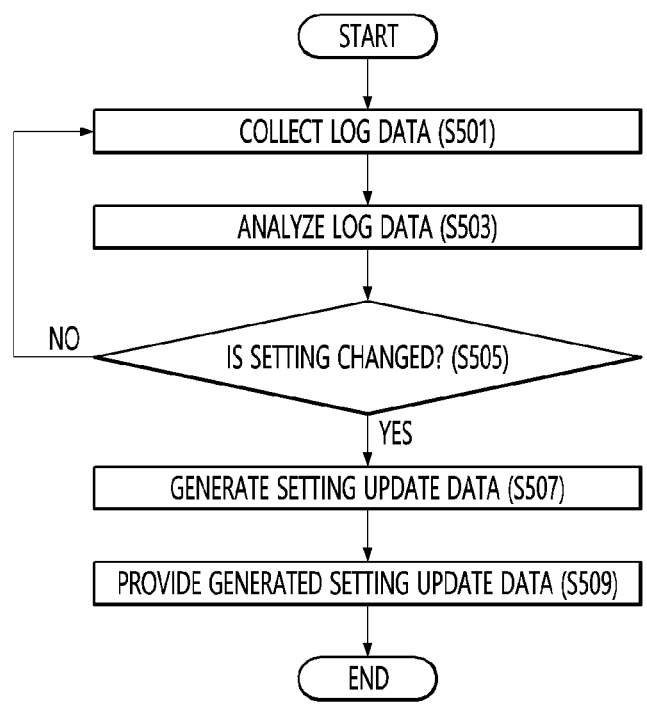

FIG. 11 illustrates a flowchart related to whether or not to perform update related to the present disclosure including the above-described sensitivity value.

Referring to FIG. 11, a server (not shown) may be configured to collect log data of the display device 100 (S501). In this case, the log data may include tuning/demodulation-related information. The tuning/demodulation-related information may include a type of tuning, the number of channel tunings, a channel tuning frequency, demodulator information, channel skip, channel degradation information such as cracking of output images of the changed channel, and the like. The type of tuning may indicate auto tuning or manual tuning. The demodulator information may include various information, such as information on a demodulator selected according to a tuning request and a channel change request, and whether or not a sensitivity value is updated. The channel skipping and the deterioration information of the changed channel may include information on a channel that is skipped when a channel is changed according to a channel change signal, information about cracking of output images of the changed channel, and the like.

The server may be configured to analyze the log data collected in step S501 (S503) and determine whether it is necessary to change previous settings (S505).

When it is determined as a result of analyzing the log data that it is necessary to change the previous settings as a result of the determination in step S505, the server may be configured to generate setting update data (S507).

The server may be configured to provide the setting update data generated in step S507, that is, perform a software update process (S509).

It is noted that the operation of the server may be also performed, for example, by the processor 550 in the display device 100. For example, the display device 100 itself may be configured to perform the process of FIG. 11 to improve the performance of video output according to processes such as tuning and demodulation, and report it to the server to be reflected in the software update.

The operations may be performed in an operation sequence different from the operation sequence illustrated in FIGS. 7 to 11. For example, some of the operations shown in FIGS. 7 to 11 may be performed simultaneously. Also, some operations may be omitted although they are illustrated in FIGS. 7 to 11.

As described above, it is possible to prevent or minimize the occurrence of channel skipping or deterioration in, for example, a display device employing a dual tuner, and enable a user to view a desired channel by preventing the occurrence of channel skipping or deterioration to increase the user's satisfaction with the use of the display device.

It is possible to prevent deterioration such as channel skipping or image cracking in a display device employing a dual tuner.

It is possible to enable a user to watch a desired channel by preventing the occurrence of channel skipping or deterioration, thus increasing the user's satisfaction with using the display device.

The above-described method may be implemented with codes readable by a processor on a medium in which a program is recorded. Examples of the medium readable by the processor include a Read Only Memory (ROM), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

What is claimed is:

1. A display device comprising:
   a display;
   a tuner including a first demodulator and a plurality of radio frequency (RF) Integrated Chips (ICs) which receive a signal through a tuned channel; and
   a processor including a second demodulator and configured to lock a channel through each of the demodulators according to a tuning request, process a signal demodulated through a demodulator selected based on a threshold sensitivity value for signal detection individually set in each of the demodulators, and control a video to be output through the display, wherein the processor is configured to receive a channel change signal, and store log data related to cracking of an output video of a changed channel and channel skipping according to the received channel change signal, and wherein the processor is configured to analyze the log data, and determine or change a threshold sensitivity value for each of the demodulators based on the analyzed log data, and wherein the demodulator is selected based on log data information indicating comparison results for demodulator performance in locking more channels.

2. The display device of claim 1, wherein the processor is configured to set different threshold sensitivity values for the first demodulator and the second demodulator for each channel.

3. The display device of claim 2, wherein the processor is configured to compare performances of signals demodulated by the first demodulator and the second demodulator for a target channel, and select a demodulator having superior signal performance as a result of the comparison of the performances of signals.

4. The display device of claim 1, wherein the processor is configured to set different threshold sensitivity values for the first demodulator and the second demodulator for each medium.

5. The display device of claim 1, wherein the processor is further configured to select the demodulator by referring to information on a number of channels locked through each of the demodulators.

6. The display device of claim 5, wherein the processor is configured to select the demodulator that locks more channels when the number of channels locked through the first demodulator and the second demodulator are not identical.

7. The display device of claim 6, wherein the processor is configured to:
obtain at least one of Received Signal Strength Indicator/Indication (RSSI) information and signal-to-noise ratio (SNR) information for comparison of signal performances, and
compare signal performances of channels respectively locked through each of the demodulators, and select a demodulator that has locked a channel with superior signal performance according to a result of the comparison of the signal performances of channels, when the number of channels locked through the first demodulator and the second demodulator are identical.

8. The display device of claim 1, wherein the processor is configured to perform setting to change a threshold sensitivity value preset in the second demodulator when a number of channels locked through the second demodulator is less than a first threshold.

9. The display device of claim 1, wherein the processor is configured to perform control to perform re-tuning when a difference between a number of channels locked through the first demodulator and the second demodulator is equal to or greater than a second threshold.

10. The display device of claim 2, wherein the log data further includes information on demodulator selection according to at least one of the tuning request and a channel change request.

11. The display device of claim 2, wherein the processor is configured to generate and transmit setting update data according to the determination or change of the threshold sensitivity value for each demodulator.

12. The display device of claim 1, wherein the tuning is one of automatic tuning and manual tuning.

13. A method for operating a display device, comprising:
receiving a signal through a tuned channel;
locking, by each of a plurality of demodulators, a channel;
processing a signal demodulated through a demodulator selected based on a threshold sensitivity value for signal detection individually set in each of the demodulators; and
performing control such that a video is output through a display,
wherein the method further comprises:
receiving a channel change signal,
storing log data related to cracking of an output video of a changed channel and channel skipping according to the received channel change signal,
analyzing the log data, and
determining or changing a threshold sensitivity value for each of the demodulators based on the analyzed log data, and
wherein the demodulator is selected based on log data information indicating comparison results for demodulator performance in locking more channels.

* * * * *